May 3, 1938.  F. M. REID  2,116,412
TRAILER VEHICLE
Filed Nov. 1, 1937
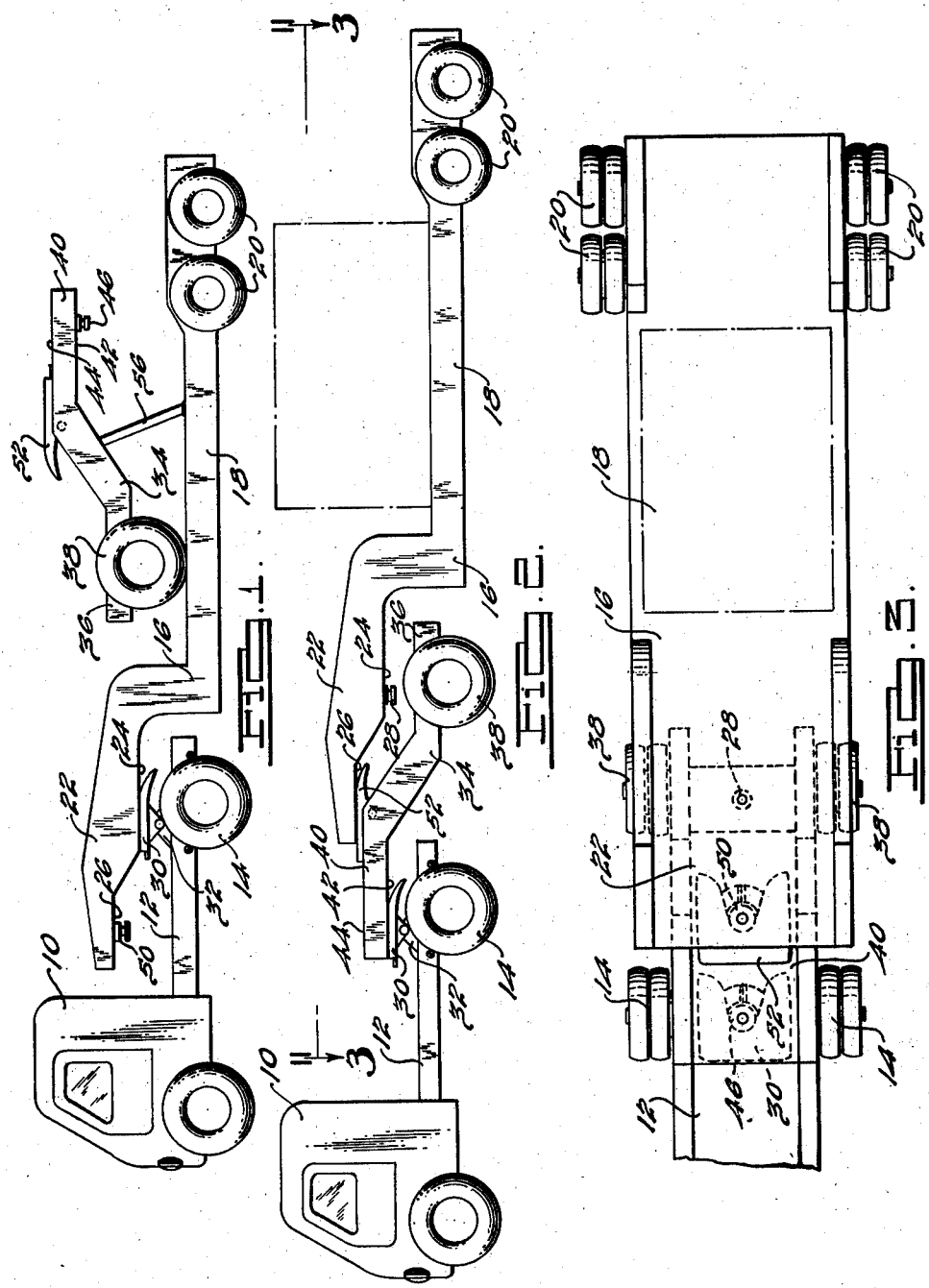
INVENTOR
Frederick M. Reid.
BY
Harness, Dickey & Pierce.
ATTORNEYS.

Patented May 3, 1938

2,116,412

UNITED STATES PATENT OFFICE 2,116,412

TRAILER VEHICLE

Frederick M. Reid, Detroit, Mich., assignor to Fruehauf Trailer Company, Detroit, Mich., a corporation of Michigan Application November 1, 1937, Serial No. 172,073

6 Claims. (Cl. 280—33.1)

This invention relates to tractor and semi-trailer combinations, and particularly relates to such combinations where the semi-trailers are readily, pivotally and removably attached to a tractor for satisfying various operating conditions.

Objects of the present invention are to provide a tractor and semi-trailer combination in which an intermediate semi-trailer may be readily interposed between a tractor and rear semi-trailer so that excessive loads may be carried; to provide a tractor and semi-trailer combination in which the length of the assembly may be varied to suit various operating conditions; to provide a rear semi-trailer of such a construction that it may be readily attached to either a tractor or to an intermediate semi-trailer; to provide an intermediate semi-trailer of such a construction that it may be readily attached to a tractor and to a rear semi-trailer for carrying excessive loads; to provide an improved tractor and semi-trailer combination having an intermediate semi-trailer in which the distance between the rear ground wheels of the tractor and the ground wheels of the intermediate semi-trailer is not excessive and can, therefore, more properly sustain a given load.

Other objects of the invention will become apparent from the following specification, the drawing relating thereto and from the claims hereinafter set forth.

In the drawing, in which like numerals are used to designate like parts in the several views throughout:

Figure 1 is a side elevational view of a tractor having a rear semi-trailer pivotally connected thereto and carrying an intermediate semi-trailer;

Fig. 2 is a side elevational view of the structure illustrated in Fig. 1 in which the intermediate semi-trailer is interposed between the tractor and the rear semi-trailer according to the present invention; and, Fig. 3 is a fragmentary top plan view, taken substantially along the line 3—3 of Fig. 2.

Present transportation regulations require that when the combined length of the tractor and semi-trailer assembly exceeds a certain amount, a special permit must be first obtained before the assembly of the excessive length is permitted on the highways. The usual load may be carried by assemblies of lengths which come within the length not requiring a permit; but for excessive loads it is necessary to use a tractor and semi-trailer assembly which exceeds the permitted assembly length. According to the present invention, a rear semi-trailer is provided which may be attached to a tractor for carrying the usual loads, and which is adapted for connection to an intermediate semi-trailer which may be interposed between the rear semi-trailer and the tractor for carrying excessive loads. The structure of the present invention thus affords an assembly which may be used without obtaining the above mentioned permit for the usual loads, but which may be readily converted into an assembly of greater length when carrying excessive loads.

Referring to the drawing, a usual automotive tractor 10, having a rearwardly extending frame 12 with ground wheels 14 connected thereto adjacent the rear end in the usual way, is provided. A rear semi-trailer 16 has a substantially horizontal load carrying frame portion 18 with ground wheels 20 connected thereto adjacent the rear end in the usual way. An upwardly and forwardly offset portion 22 is provided adjacent the front of the frame portion 18 and has stepped substantially horizontal under-surfaces 24 and 26 at different levels.

The rear semi-trailer 16 is connected to the tractor 10, as illustrated in Fig. 1, by a pivotal connection such as a fifth wheel structure. The fifth wheel structure is preferably that disclosed in detail in the patent to Frederick M. Reid, No. 1,925,279, issued September 5, 1933; and includes a downwardly directed king-pin member 28 secured to the under-surface 24 of the rear semi-trailer. The king-pin 28 is adapted to engage a lower fifth wheel member 30, of the structure disclosed in the above mentioned patent, which is pivotally connected to the frame 12 through brackets 32. When the semi-trailer 16 is connected directly to the tractor 10 by the king-pin member 28, as illustrated in Fig. 1, the assembly is then adapted to carry the usual load.

For carrying excessive loads an intermediate semi-trailer 34 is provided which has a rear substantially horizontal frame portion 36 to which ground wheels 38 are connected in the usual way. The intermediate semi-trailer 34 has an upwardly and forwardly projecting portion 40 adjacent the front of the frame portion 36, which has a substantially horizontal undersurface 42 and a substantially horizontal upper surface 44 spaced a predetermined distance from the under-surface.

The intermediate semi-trailer 34 is adapted to be positioned between the rear semi-trailer 16 and the tractor 10; and is connected to the tractor 10 by fifth wheel mechanism similar to that described in the Reid patent referred to. The fifth wheel connection includes a downwardly directed king-pin member 46 fixed to the under-surface 42 which is adapted to co-operate with the lower fifth wheel member 30 to pivotally attach the semi-trailer 34 to the tractor. The under-surface 42 and the king-pin 46 are both at substantially the same level as the under-surface 24 and the king-pin 28, respectively, on the rear semi-trailer 16, so that either the rear or intermediate semi-trailers may be readily attached to the lower fifth wheel member 30 without any change in the tractor structure or the structure of the lower fifth wheel means on the tractor.

The rear semi-trailer 16 is also provided with a fifth wheel connecting member in the form of a downwardly directed king-pin 50 which is fixed on the upper, under-surface 26 of the rear semi-trailer. The king-pin 50 is adapted to co-operate with a lower fifth wheel means 52, which is similar to the member 30. The lower fifth wheel member 52 is adapted to be suitably pivotally mounted to the intermediate trailer 34 on the upper surface 44.

The king-pins 28 and 46 are at substantially the same level; and the distance between the surface 24 and surface 26 is substantially the same as the distance between the surface 42 and the surface 44, so that the semi-trailers may be assembled in either the arrangement illustrated in Fig. 1 or that illustrated in Fig. 2. By the arrangement described above the distance between the ground wheels 14 and 38, when the semi-trailers are assembled in the manner illustrated in Fig. 2, is not excessive so that the excessive load carried by the semi-trailers is properly supported.

As illustrated in Fig. 1 the intermediate semi-trailer 34 may be carried by the rear semi-trailer 16 when the assembly is travelling to pick up a load. A suitable strut 56 is provided which is pivotally mounted to the frame of the semi-trailer 34 for supporting the forward portion of the trailer in its upward position.

Formal changes may be made in the specific embodiment of the invention described without departing from the spirit and substance of the invention, the scope of which is commensurate with the appended claims.

What is claimed is:

1. A vehicle trailer structure comprising, in combination, a tractor, a rear semi-trailer, and an intermediate semi-trailer interposed between said rear semi-trailer and said tractor, said rear semi-trailer having a first connecting member and a second connecting member thereon at different levels, said tractor having a co-operating connecting member thereon at the level of said first connecting member, and said intermediate semi-trailer having a co-operating connecting member thereon at the level of the first connecting member and having another co-operating connecting member thereon at the level of the second connecting member, said connecting members providing pivotal connections between said tractor, said intermediate semi-trailer and said rear semi-trailer.

2. A semi-trailer structure comprising a substantially horizontal rear portion, ground wheels connected to said rear portion, an upwardly and forwardly offset portion connected to said horizontal portion adjacent the front thereof, and a pair of pivotal connecting means on said last named portion located at different levels thereon.

3. A semi-trailer structure comprising a substantially horizontal rear portion, ground wheels connected to said rear portion, an upwardly and forwardly offset portion connected to said horizontal portion adjacent the front thereof, the under-surface of said last named portion being stepped to provide a plurality of substantially horizontal under-surfaces thereon at different levels, and a pivotal connecting means located on each of said horizontal under-surfaces.

4. A semi-trailer structure comprising a substantially horizontal rear portion, ground wheels connected to said rear portion, an upwardly and forwardly offset portion connected to said horizontal portion adjacent the front thereof, the under-surface of said last-named portion being stepped to provide a plurality of substantially horizontal under-surfaces thereon at different levels, and a downwardly directed king-pin located on each of said horizontal under-surfaces.

5. A semi-trailer structure comprising a substantially horizontal rear portion, ground wheels connected to said rear portion, an upwardly and forwardly offset portion connected to said horizontal portion adjacent the front thereof, said offset portion being formed with a substantially horizontal under-surface and a substantially horizontal top surface spaced therefrom a predetermined distance, a pivotal connecting means located on said horizontal under-surface, and a pivotal connecting means located on said horizontal top surface.

6. A vehicle trailer structure comprising, in combination, a tractor, a rear semi-trailer, and an intermediate semi-trailer interposed between said rear semi-trailer and said tractor; said rear semi-trailer having a substantially horizontal rear portion, ground wheels connected to said rear portion, an upwardly and forwardly offset portion connected to said horizontal portion adjacent the front thereof, the under-surface of said last named portion being stepped to provide a plurality of substantially horizontal under-surfaces thereon at different levels, a first king-pin located on one of said horizontal under-surfaces, and a second king-pin located on the other horizontal under-surface; said tractor having a co-operating connecting member thereon at the level of said first king-pin; and said intermediate trailer having a substantially horizontal rear portion, ground wheels connected to said rear portion, an upwardly and forwardly offset portion connected to said last named horizontal portion adjacent the front thereof, said last named offset portion being formed with a substantially horizontal under-surface and a substantially horizontal top surface spaced therefrom a distance substantially equal to the distance between the under-surfaces on said rear semi-trailer, a pivotal connecting means located on said last named horizontal under-surface, and a pivotal connecting means located on said horizontal top surface.

FREDERICK M. REID.